Figure 3:
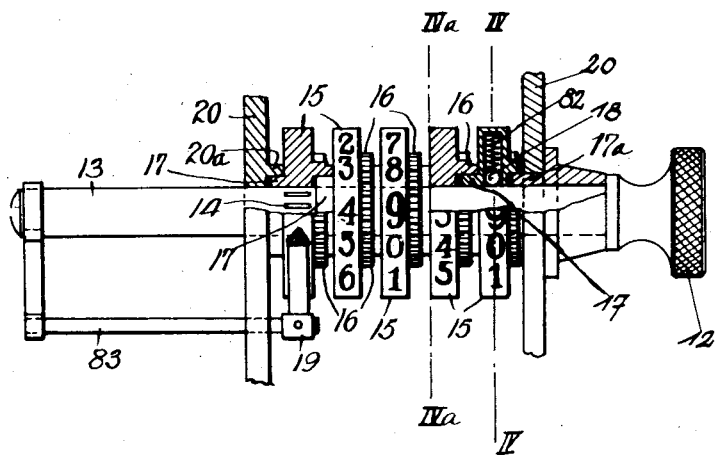

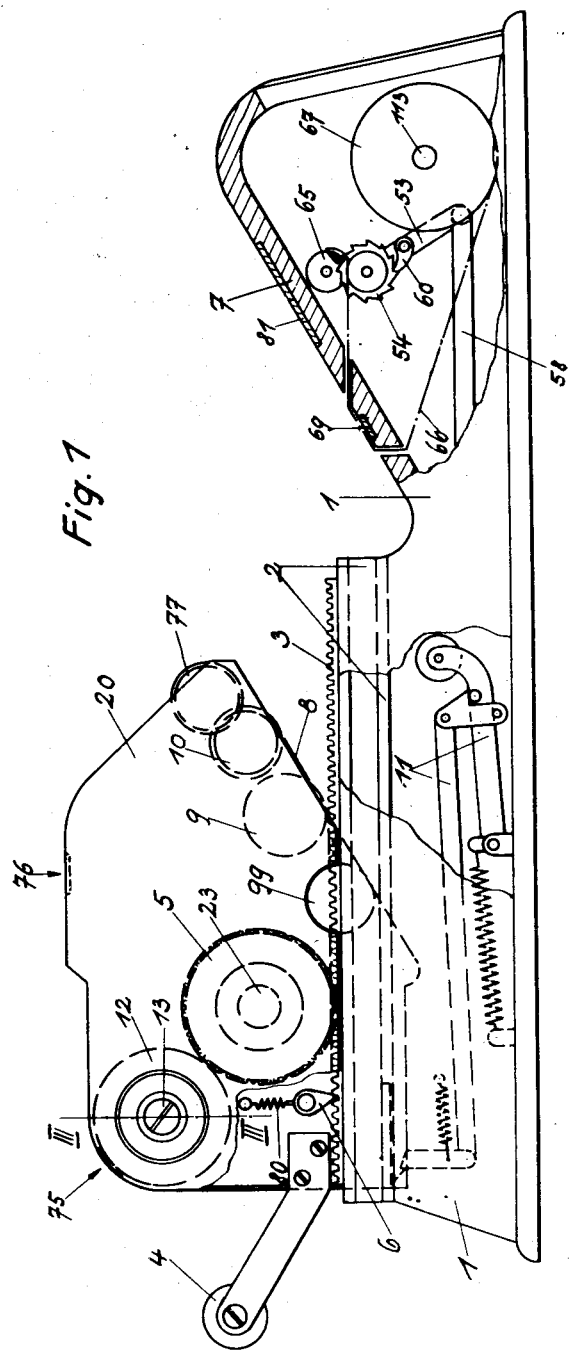

Inventor:
Hans Widmaier

Aug. 27, 1935.  H. WIDMAIER  2,012,330
LISTING CALCULATING MACHINE
Filed Aug. 13, 1930  5 Sheets-Sheet 3

Inventor:
Hans Widmaier

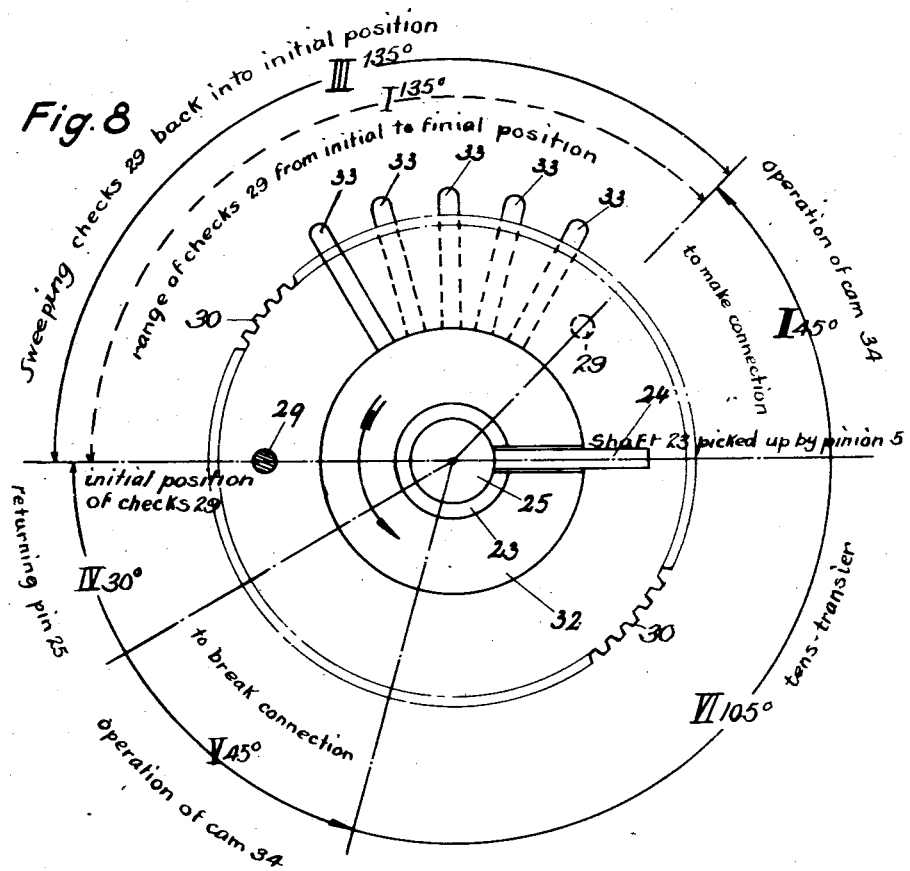

Aug. 27, 1935.  H. WIDMAIER  2,012,330
LISTING CALCULATING MACHINE
Filed Aug. 13, 1930   5 Sheets-Sheet 5

Inventor:
Hans Widmaier

Patented Aug. 27, 1935

2,012,330

UNITED STATES PATENT OFFICE 2,012,330

LISTING CALCULATING MACHINE

Hans Widmaier, Munich-Harlaching, Germany

Application August 13, 1930, Serial No. 474,946
In Germany May 5, 1930

6 Claims. (Cl. 235—58)

My invention relates to listing and calculating machines.

It is an object of my invention to provide a listing and calculating machine whose operation is performed by movement in a given direction, and whose mechanism is returned into its initial position by movement in the opposite direction. To this end, in a machine of the kind described, I provide a frame on which a carriage is mounted for reciprocating movement. This carriage is equipped with calculating and printing mechanism, and with a driving wheel which, on the one hand, is operatively connected to the mechanism on the carriage, and on the other hand, to means on the frame for rotating the driving wheel as the carriage is reciprocated on the frame. For instance, the driving wheel may be a pinion, and mesh with a rack on the frame. An impression plate is provided for cooperation with the printing mechanism on the carriage.

By these means, the mechanism on the carriage is operated by the driving wheel during the forward and during the return stroke of the carriage. During the forward stroke, the parts of the mechanism are moved into the position required for printing on the impression plate, and during the return stroke they are returned into their individual initial positions, so that the carriage, at the end of its return stroke, is ready for the next operation.

In the drawings affixed to the specification and forming part thereof a listing and receipting machine embodying my invention is illustrated diagrammatically by way of example.

In the drawings

Figure 4:
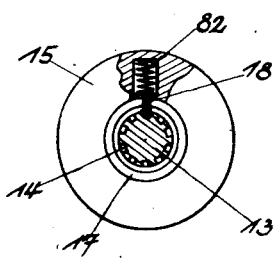
Figure 4A:
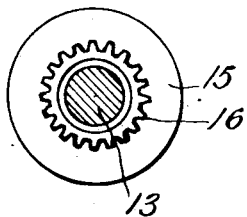

Fig. 1 is an elevation showing the complete machine with most of its details omitted, and with its frame partly broken open, Fig. 2 illustrates a receipt, Fig. 2a illustrates a portion of the recording strip with some entries, Fig. 3 illustrates the setting mechanism of the machine, partly in section on the line III—III in Fig. 1, Fig. 4 is an end elevation of the setting mechanism, partly in section on the line IV—IV in Fig. 3, Fig. 4a is a section on the line IVa—IVa in Fig. 3.

Figure 5:
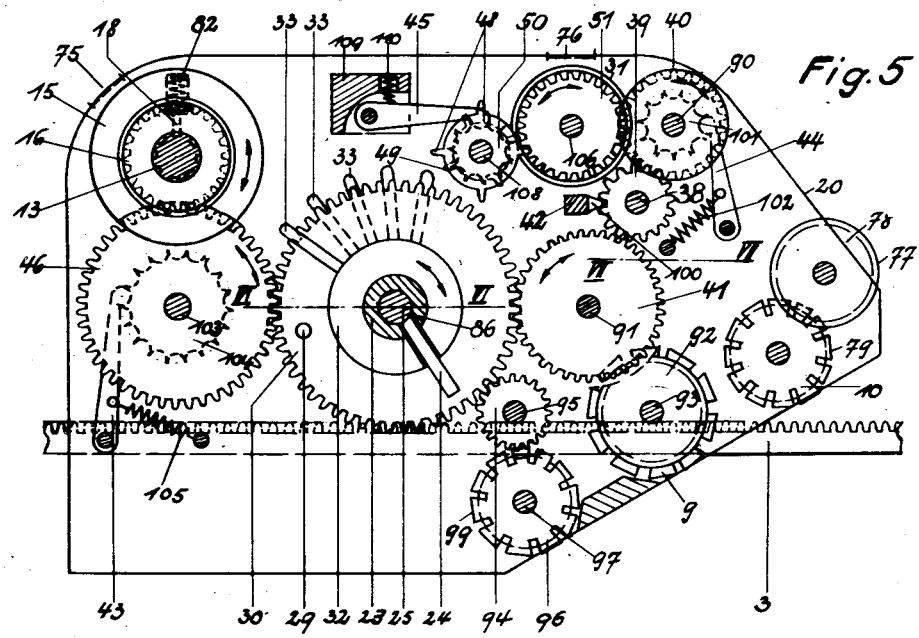
Figures 6, 7:
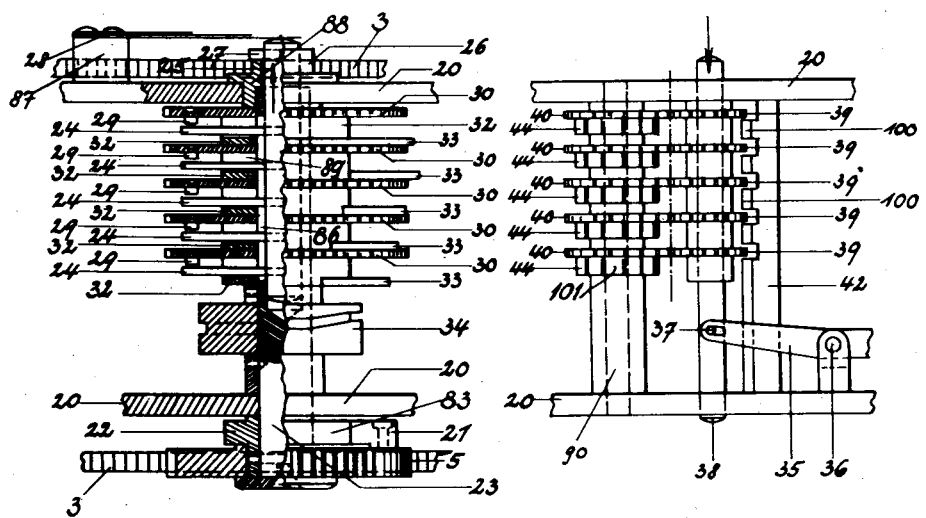
Figure 10:
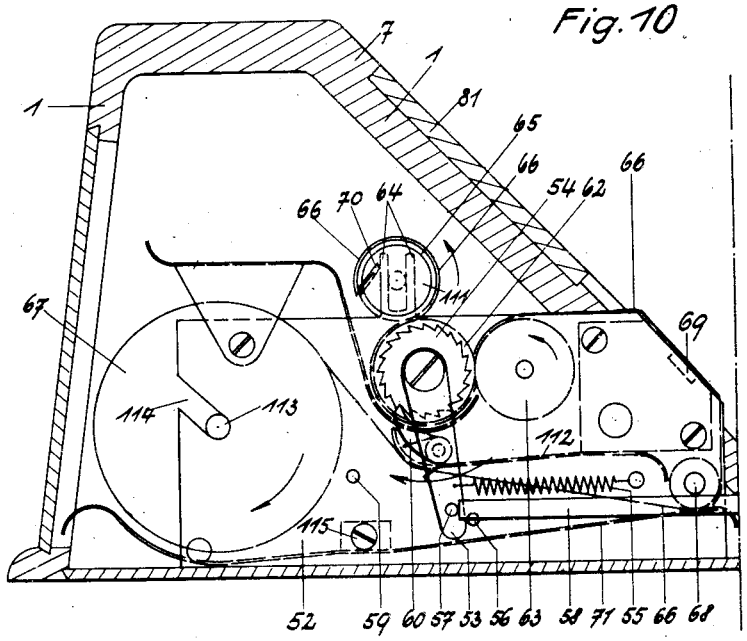
Figure 11:
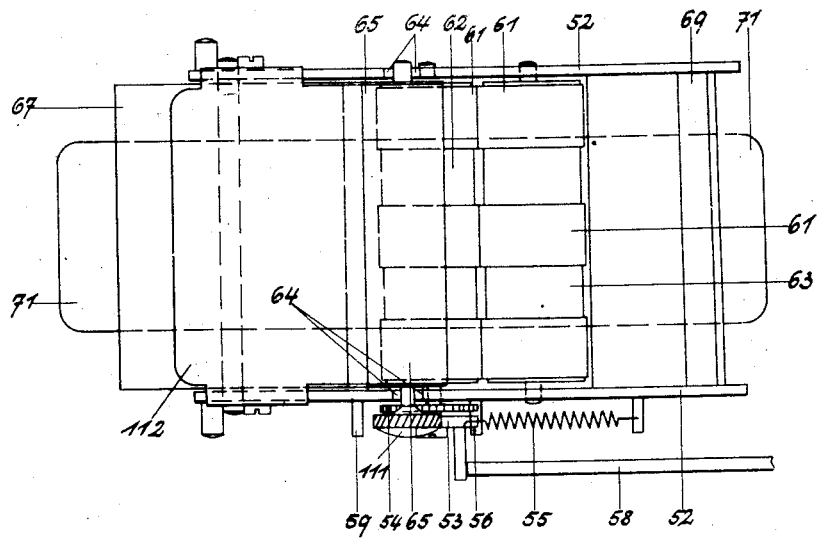

Fig. 5 is a central longitudinal section of the carriage of the machine, drawn to a larger scale, showing the mechanism, Figs. 6 and 7 are sections on the corresponding lines in Fig. 5, Fig. 8 is a diagram illustrating the operation cycle of the machine, Fig. 9 is a detail showing the driving pinion of the carriage, Fig. 10 is a section of the frame showing the mechanism for feeding the recording strip, and Fig. 11 is a plan view of the mechanism.

Referring now to the drawings, and first to Fig. 1, I is the frame of the machine, 2 is one of two longitudinal bars in the frame on which the carriage 20 is fitted to slide, 3 is a rack on the bar 2, and 4 is a handle at the rear of the carriage 20, 5 is the driving wheel referred to, here shown as a pinion which is free to rotate on the main driving shaft 23 of the registering mechanism on the carriage 20, as will be described. 12 is the knob of the setting mechanism which is assembled on a shaft 13, 75 is a sight opening in the top of the carriage 20 for surveying the setting mechanism, 76 is a sight opening for reading the indications of an accumulator 9, and 99 are figure-printing type wheels, and 10 is a date-printing type wheel, with a hand wheel 77, and gears 78, 79 for setting it.

6 is a pawl with a spring 80 which is fitted to rock on the carriage 20 and is adapted to cooperate with the rack 3. The object of the pawl is to prevent the carriage from starting for a stroke in a given direction before the preceding stroke in the opposite direction has been completed. Mechanism of this type are old in the art and therefore the operation and construction of the pawl 6 is not described.

II is an inking mechanism in the frame I which is operated automatically by suitable means, not shown, for inking the rollers 9, 99 and 10 at a given point of the forward stroke of the carriage, that is, its stroke to the right in Fig. 1.

81 and 69 are impression pads of rubber or the like at the front end of the machine. The pads are embedded in a plate 7 of the frame I which is inclined in parallel with the front face 8 of the machine. By inclining the two faces 7, 8 a wedge-like action is exerted on the impression pads.

The impression pad 81 cooperates with the date-printing wheel 10 and the upper figure-printing wheel 9 to print a dated receipt, as shown in Fig. 2, and the impression pad 69, in cooperation with the lower figure wheel 99, prints a recording strip 66 part of which is shown in Fig. 2a. Mechanism for feeding the recording strip 66 comprises a push bar 58 which is moved in time with the reciprocation of the carriage 20 by any suitable means, not shown; a rocking lever 53 to which the bar 58 is pivoted, or with which it is operatively connected by a pin 57 at the end of lever 53, Figs. 16 and 17; a pawl 60 on the lever 53 for the ratchet wheel 54; a supply roller 67, and a winding roller 65 for the strip 66. These parts will be described in full detail with reference to Figs. 16 and 17. Numbering mechanisms, not shown, may be connected with the printing means for numbering each receipt and for printing the corresponding number on the recording strip against the amount receipted, as shown in Figs. 2 and 2a.

My machine compares favorably with other machines in which the printing operations are performed by cranks or levers. In such machines the size of the paper printed on is limited, and a definite position of the paper with respect to the printing rollers and other parts of the printing mechanism is required. According to my invention the carriage 20, with the complete calculating and printing mechanism mounted therein, is reciprocated by hand on the bars 2 while at the same time the mechanisms are operated by the rotation of the pinion 5 which results from the reciprocation of the carriage, and printing is effected when the carriage has arrived at the inclined plate 7, with its impression pads 81 and 69.

Referring now to Figs. 3 and 4, the shaft 13 of the setting mechanism, with its handle 12, is adapted to be rotated and to be displaced axially in the side plates of the carriage 20, and connected with an indicator 19 by a rod 83. 15 are five numeral wheels placed side by side on the shaft 13 on which they are free to rotate but are held against axial displacement with the shaft by the carriage side plates. Every numeral wheel is equipped with an undercut annular gear 16 at the right, and with a flange 17 at the left which engages below the undercut gear wheel of the adjacent numeral wheel 15. A sleeve 12a is mounted on the shaft 13 as an extension of the handle 12 and is provided with an inwardly projecting seat or flange 17a which replaces the flanges 17 of the other numeral wheels. The flange 17 of the first numeral wheel from the right appears in Fig. 4 which is viewed from the left in Fig. 3. The undercut gear 16 of the third numeral wheel from the right appears in Fig. 4a which is viewed from the left in Fig. 3. It will appear that the flange 17 of every numeral wheel 15 fits the undercut gear wheel 16 of the next numeral wheel. The flange 17 of the last numeral wheel 15 at the left engages in a bearing 20a on the corresponding side plate 20.

By the means described, the numeral wheels are mounted to rotate freely with respect to the shaft 13 and to each other but are held against axial displacement with respect to the shaft 13. The numeral wheels constitute a self-supporting unit, the shaft 13 is relieved of any forces, and the numeral wheels cannot seize on each other or on the shaft 13.

14 are grooves in parallel to the axis of the shaft 13 which are in line with the numeral wheel 15 at the left end of the set when the handle 12 has been pushed home, as shown. The length of the grooves is equal to the width of a numeral wheel. Each numeral wheel is equipped with a clutching member 18, as shown for the numeral wheel at the right. The clutching members are flat circular discs which are adapted to engage in the grooves 14 when such grooves are in line with the corresponding numeral wheel, and 82 are springs in recesses of the numeral wheels which urge the plates 18 into the grooves 14 as shown in Fig. 2. When the handle 12 is pulled out until the indicator 19 points to a given numeral wheel 15 the grooves 14 move into registering relation with this numeral wheel and its clutching member 18 enters one of the grooves 14 under the action of its spring 82, so that the wheel rotates with the shaft 13. When the shaft is displaced for connecting it with another numeral wheel, the clutching member 18 is raised and readily leaves its groove which is as readily entered by the clutching member of the next wheel. The ends of the grooves are rounded for facilitating the movement of the clutching members. Means, not shown, are provided for preventing overthrowing of the numeral wheels 15.

It is an important advantage of my invention that the shaft 13 need not be in an exactly predetermined position with respect to the numeral wheels as the clutching member 18 connects the corresponding numeral wheel with the shaft 13 as soon as it has only just entered the end of a groove 14. There is no possibility of operating two numeral wheels at a time, even if the grooves 14 are placed intermediate two numeral wheels by oversight.

The setting mechanism possesses the favorable properties of simplicity and smallness. Setting mechanisms as designed heretofore with their full keyboards, keyboards of ten keys, push buttons, slides and levers are complicated, large and confusing, require delicate handling, and are obviously expensive. When such complicated mechanisms have been set they either display a confused maze of indications, or they return into zero position immediately, so that separate registering means have to be provided. This involves not only more complication but also the drawback that the indications of the registering means are remote from those of the setting mechanism, and the attention of the operator is greatly strained.

In my invention the setting mechanism and the registering means are combined into a single unit comprising only the freely rotatable and independently supported numeral wheels 15, the shaft 13 with its grooves 14, and the clutching means 18.

Referring now to Figs. 5, 6 and 7, the pinion 5, with the main driving shaft 23, has already been mentioned. As best seen in Fig. 6, the main driving shaft 23 is mounted to rotate in the side plates of the carriage 20. 22 is a ratchet wheel with a single tooth 83 on the shaft 23 between the pinion 5 and the side plate at the right, the pinion being mounted to rotate freely on the boss of the ratchet wheel, 21 is a pawl which is pivoted on the pinion 5 at 84, Fig. 9, and 85 is a spring which tends to hold the pawl 21 engaged with the tooth 83 so that the shaft 23 is entrained when the pinion 50 rotates in a given direction upon the carriage 20 being displaced along the rack 3. The end of the shaft 23 which is supported in a bearing 26 on the left side plate of the carriage, is bored axially and slotted at 86. Inserted in the bore is a pin 25 with a set of radial teeth 24 which project through the slot 86. By these means the shaft 23 and the pin 25 are held against rotation with respect to each other but the pin 25 is free to move axially in the bore of the shaft 23. 28 is a spring which is secured to a bracket 87 at the side plate at the right of the carriage 20, with its free end exerting thrust on the pin 25, 27 is a dog which projects radially from the end of the pin 25 at the left, and 88 is a cam face at the outer end of the bearing 26 by which the pin 25 is displaced axially against the spring 28 as it rotates with the shaft 23. 30 are calculating wheels which are arranged intermediate the teeth 24, with their bosses mounted to rotate on the main driving shaft 23, 32 are distance sleeves between the calculating wheels, 89 are slots in the distance sleeves in which the teeth 24 are free to move with the pin 25, and 29 are checks on the calculating wheels 30 which are adapted to be engaged by the corresponding teeth 24 when the pin 25 is displaced to the left by the cam 88, as indicated by the arrow in Fig. 6. 33 are teeth for the tens-transfer which are secured to the distance sleeves 32 in such manner that they make up a helical line together.

34 is a grooved cam plate which is secured on the shaft 23 intermediate the side plate at the right of the carriage 20 and the set of wheels and teeth on the shaft, and 35, Fig. 7, is a rocking lever which is equipped with a pin at the end shown broken away in Fig. 7 for engaging a groove of the cam plate 34. The lever 35 is fulcrumed at 36 and with its slotted end engages a pin 37 on a reciprocating control shaft 38. 39 are pinions on the shaft which mesh with gear wheels 40 on a lay shaft 90 and with gear wheels 41 on another lay shaft 91. The gear wheels 41, in turn, mesh directly with gear wheels 92 on the shaft 93 of the upper or receipt-printing set of type wheels 9, and with the calculating wheels 30 on the shaft 23, while rotation is imparted to the lower or record-printing set of type wheels 99 from the calculating wheels 30, through the medium of intermediate pinions 94 on a lay shaft 95, and gear wheels 96 on the shaft 97 of the record-printing set 99. Rotation is imparted to this mechanism after the pinions 39 on the control shaft 38 are moved into meshing relation with the gear wheels 40 on the shaft 90. 42 is a transverse bar between the side plates of the carriage 20 and 100 are teeth projecting from the transverse bar so as to engage the teeth of the pinions 39 and to hold them against rotation when the control shaft 38 is moved by the rocking lever 35 and the teeth 39 come out of mesh with the gear wheels 40 on the shaft 90. 101 are star wheels at the sides of the wheels 40 on the shaft 90, and 44 are pawls equipped with springs 102 for engaging the star wheels and for preventing overthrowing of the wheels 40.

103 is a shaft near the rear end of the carriage 20, and 46 are gear wheels on the shaft which mesh with the pinions 16, Fig. 3, of the numeral wheels 15, and also with the calculating wheels 30 on the shaft 23. 104 are star wheels on the gear wheels 46, 43 are pawls and 105 are springs connected with the pawls, for preventing overthrowing of the gear wheels 46.

The accumulator and the tens-transfer mechanism are mounted on two parallel shafts 106 and 108. Numeral wheels 31 with gear wheels 51 are mounted on shaft 106. The gear wheels 51 mesh with gear wheels 40 on shaft 90, as described. The members of the tens-transfer mechanism which is not a part of my invention, and therefore is not shown and described in detail, are mounted on the shaft 108 and marked generally with the numeral "49". Overthrowing is prevented by star wheels 50, pawls 45 fulcrumed in a transverse bar 109, and springs 110 forcing the pawls against the teeth of the corresponding star wheels. The tens-transfer mechanism is operated by the tens-transfer teeth 33.

The operation of my machine will now be described. At the beginning of a cycle, the carriage 20 is moved into its initial position at the left-hand end of the frame 1, as shown in Fig. 1, the checks 29 on the calculating wheels 30, and the teeth 24 on the pin 25 in the hollow driving shaft 23, being in their respective initial positions.

The setting mechanism on the shaft 13 is set for a given numeral by displacing the shaft 13 through the medium of the handle 12 so as to move the grooves 14 into registering relation with the numeral wheels 15 to which the indicator 19 points, and the shaft is then rotated to show the desired numerals in the sight opening 75. The rotation of the shaft 13 is transmitted to the corresponding calculating wheel 30 through the medium of the corresponding intermediate wheel 46 on the shaft 103. The check 29 on this wheel now assumes a definite position with respect to the corresponding tooth 24. The angle through which the calculating wheels rotate from their initial position while being adjusted for setting up the desired amount, is limited to a maximum range of 135°, as indicated by the arc I in Fig. 8. The final position to which a check, or all the checks, can be moved, is shown in dotted lines at the right in Fig. 8. After the calculating wheels 30 have been adjusted and have transmitted their partial rotation to the printing wheels 99 through the mechanism described with reference to Fig. 5, the carriage 20 is shifted to the right as far as the plate 7, where the sheets are printed while on the impression pads 69 and 81. While the carriage moves from its initial position at the left to its printing position at the right, the shaft 23 is not rotated as the pinion 5 turns idly on the boss of the ratchet wheel 22, and against the arrow in Fig. 9, so that the pawl 21 does not entrain the shaft 23.

When the printing operation has been completed, the carriage 20 is returned into its initial position at the left-hand end of the frame 1, as shown in Fig. 1. In this direction, the pinion 5 picks up and rotates the shaft 23. At the beginning of the return movement, the teeth 24 are in the initial horizontal position shown in Fig. 8 and as the teeth 24 rotate with the shaft 23, the rotation of the shaft in the direction of the arrows in Figs. 8 and 9 moves the teeth 24 through an angle of 45°, arc II, until they pick up that check 29, or those checks, which is in the final position at the end of arc I at the right. At the beginning of arc II, the pin 25 in the driving shaft 23 is shifted in the direction of the arrow in Fig. 6 by the cam face 88 at the outer end of bearing 26, moving the teeth 24 into active position with respect to the checks 29 on the calculating wheels 30. At the same time the control shaft 38 is displaced by the grooved cam 34 and the rocking lever 35 so that the pinions 39 on the control shaft 38 move out of engagement with the teeth 100 on the bar 42, and into engagement with the gear wheels 40 on the shaft 90, connecting the calculating wheels 30 to the gear wheels 51 of the accumulator, Fig. 5. At the end of arc II, the teeth begin to pick up the checks 29 on the calculating wheels 30 and sweep them home from their several positions until they are all again in the initial position at the left. The sweeping of the checks 29 is effected in the arc III whose length is equal to that of the arc I and also corresponds to 135°. As during the sweeping operation the numeral wheels 15, the printing wheels 9 and 99 and the accumulator 31 are operatively connected, the numeral wheels 15 and the printing wheels 9 and 99 are returned to zero, while the amount which has been printed, is transmitted to the accumulator 31.

At the very beginning of the rotation through arc IV which corresponds to 30°, the cam 88, Fig. 6, allows the spring 28 to return the pin 25, with the teeth 24, into the position shown in Fig. 6 in which the teeth 24 are free of the checks 29 on the numeral wheels 30.

During the rotation through arc V, corresponding to 30°, the grooved cam 34 breaks the described connection of the calculating wheels and the accumulator and during the rotation through arc VI, corresponding to 105°, the teeth 33 operate the tens-transfer mechanism, which does not constitute a part of the present invention.

It is to be understood that when the carriage moves to the right (Fig. 1) the pinion 5 makes slightly over a complete revolution clockwise, so that pawl 21 is in position to pick up the single tooth member 22 at the beginning of the return movement of the carriage and to turn shaft 23 one complete revolution counter-clockwise for each complete operation. Alining mechanism may be provided to insure the stopping of shaft 23 in normal full cycle position.

Means, not shown, may be provided for returning the numeral wheels of the accumulator to zero.

Referring now to Figs. 10 and 11, and also to Fig. 1, 52 is a frame which has been omitted in Fig. 1. This frame encloses the complete strip feeding mechanism, with the exception of the rocking lever 53, with its pawl 60. In Fig. 1, the push bar 58 is shown as hinged to the end of the lever 53, while in Figs. 10 and 11 a pin 57 is shown at the end of the lever which is acted on by the push bar 58, the bar moving in time with the reciprocation of the carriage 20, 55 is a spring which normally holds the lever 53 engaged with a check 56 while the push bar 58 rocks the lever in the direction of the arrow, Fig. 10, and 59 is another check which limits the rocking movement of the lever 53 in this direction. Fitted on the shaft of the ratchet wheel 54 within the frame 52 is a feeding roller 62 having belts 61 of rubber or the like. 63 is a roller, also provided with belts 61, which moves in contact with the roller 62 before the strip 66 is threaded between the rollers, 65 is a roller which is supported in open bearings 64 on top of the frame 53 above the roller 62. 70 is a longitudinal slot in the roller 55 in which the end of the strip 66 is inserted, as shown in Fig. 16, and 111 is a hand wheel on the shaft of the roller 65 by which it is rotated in order to thread the strip 56 through the frame 52, 112 is a deflector, with its curved rear end adjacent the roller 62, and its curved front end adjacent a guiding roller 68. The shaft 113 of the supply roller 67 is inserted in slots 114 of the frame 52. 71 is a spring which is fixed on the frame at 115 and with its free end exerts pressure on the guiding roller 68.

The strip 66 is taken from the supply roller 67 and threaded past the curved front end of the deflector 112, in between the guiding roller 68, and the spring 71, along the record impression plate 69, means, not shown, being provided for guiding the strip in parallel to the inclined rear end of the frame 52, in between the belts 61 on the rollers 62 and 63, and around the roller 62, whereupon its end is inserted in the slot 70 of the roller 65. The strip is tensioned by rotating the hand wheel 111, and the feeding mechanism is now ready for operation. As the strip 66 is wound on the roller 65 the diameter of this roller increases but its shaft is free to rise in the open bearings 64. Tension is imparted to the strip by the spring 71 and the guiding roller 68 so that it lies flat on the impression plate 69.

Feeding mechanisms for recording strips as designed heretofore are partly rather complicated and often accessible with difficulty only when it is desired to insert a new strip or to inspect the mechanism. My feeding mechanism is equipped with few rollers only, one operating lever 53 and one ratchet wheel 54, and the push bar 58. The frame 52 is readily accessible for inserting a new strip 66 and for inspection.

My novel feeding mechanism may also be adapted to other calculating machines, cash registers, and similar apparatus to which it is readily fitted on account of its simplicity and small size.

I wish it to be understood that I do not desire to be limited to the exact details of constructions shown and described for obvious modifications will occur to a person skilled in the art.

I claim:—

1. A listing and calculating machine comprising a frame, a carriage fitted to reciprocate on said frame, calculating and printing mechanism on said carriage, a driving wheel on said carriage, which is operatively connected with said mechanism, means on said frame for rotating said wheel as said carriage is reciprocated on said frame, and an impression plate adapted to cooperate with said printing mechanism on said carriage.

2. A listing and calculating machine comprising a frame, a carriage fitted to reciprocate on said frame, calculating and printing mechanism on said carriage, a rack on said frame, a pinion on said carriage which meshes with said rack and is operatively connected with said mechanism, and an impression plate adapted to cooperate with said printing mechanism on said carriage.

3. A listing and calculating machine comprising a frame, a carriage having an inclined front end and fitted to reciprocate on said frame, calculating and printing mechanism on said carriage, type wheels forming part of said printing mechanism and projecting from said inclined front end, a driving wheel on said carriage, which is operatively connected with said mechanism, means on said frame for rotating said wheel as said carriage is reciprocated on said frame, and an impression plate which is parallel with said inclined front end and adapted to cooperate with said printing mechanism on said carriage.

4. A listing and calculating machine comprising a frame, a carriage having an inclined front end and fitted to reciprocate on said frame, calculating and printing mechanism on said carriage, type wheels forming part of said printing mechanism and projecting from said inclined front end, a driving wheel on said carriage, which is operatively connected with said mechanism, means on said frame for rotating said wheel as said carriage is reciprocated on said frame, and an impression plate on said frame which is parallel with said inclined front end and adapted to cooperate with said printing mechanism on said carriage.

5. A listing and calculating machine comprising a frame, a carriage fitted to reciprocate on said frame, a calculating mechanism on said carriage which mechanism comprises a driving shaft, calculating wheels mounted to rotate freely on said driving shaft, a check on each calculating wheel, a pin fitted to slide in an axial bore at one end of said shaft, teeth on said pin projecting through a slot in said shaft and adapted to cooperate with said checks on said calculating wheels, resilient means tending to move said pin so as to disengage its teeth from the checks on said calculating wheels, a fixed cam operatively connected with said pin so as to move said teeth into engaging position with respect to said checks against said resilient means, distance sleeves mounted on said shaft intermediate said calculating wheels and slotted for the reception of said teeth, tens-transfer teeth on said distance sleeves arranged in staggered relation, a pinion fitted to rotate on said driving shaft, means on said frame for rotating said pinion in opposite directions as said carriage is reciprocated on said frame, means for operatively connecting said wheel and said driving shaft in a given direction only, and an impression plate adapted to cooperate with said printing mechanism on said carriage.

6. A listing and calculating machine comprising a frame, a rail on said frame, a rack on said rail, a carriage mounted to reciprocate on said frame by running on said rail, calculating and printing mechanism on said carriage, a driving wheel on said carriage operatively connected to the mechanism therein, teeth on said wheel meshing with said rack so that said wheel is rotated as said carriage is reciprocated, and a fixed impression plate adapted to cooperate with the printing mechanism on said carriage.

HANS WIDMAIER.